United States Patent
Kibe

Patent Number: 5,842,341
Date of Patent: Dec. 1, 1998

[54] EXHAUST EMISSION PURIFICATION APPARATUS FOR AN INTERNAL COMBUSTION ENGINE

[75] Inventor: Kazuya Kibe, Susono, Japan

[73] Assignees: Toyota Jidosha Kabushiki Kaisha, Aichi; Denso Corporation, Aichi-Pref., both of Japan

[21] Appl. No.: 903,706

[22] Filed: Jul. 31, 1997

[30] Foreign Application Priority Data

Aug. 2, 1996 [JP] Japan .................................. 8-204954

[51] Int. Cl.$^6$ .................. F01N 3/20; F01N 3/36
[52] U.S. Cl. .................. 60/274; 60/286; 60/303; 422/183
[58] Field of Search ............. 60/274, 286, 301, 60/303; 422/177, 180, 183

[56] References Cited

U.S. PATENT DOCUMENTS 5,201,802   4/1993   Hirota et al. ........................... 60/301 X
5,665,318   9/1997   Rembold et al. ...................... 60/301 X

FOREIGN PATENT DOCUMENTS

4305865   8/1993   Germany .
4-214919  8/1992   Japan .
8-158859  6/1996   Japan .

*Primary Examiner*—Tony M. Argenbright
*Attorney, Agent, or Firm*—Kenyon & Kenyon

[57] ABSTRACT

An exhaust emission gas purification apparatus for an internal combustion engine is disclosed, in which a proper purification rate can be maintained even at a transient time by suppressing an excessive temperature increase of a lean $NO_x$ catalyst. In order to improve the purification efficiency of a lean $NO_x$ catalyst 307, diesel fuel constituting a hydrocarbon material capable of reducing the $NO_x$ is supplied by way of a diesel fuel injection hole 311. A basic amount of diesel fuel to be supplied is determined on the basis of a space velocity SV providing a quantity of state representing the operating conditions of the catalyst calculated from the intake air amount detected by an air flowmeter 302 and the catalyst temperature detected by an outlet exhaust gas temperature sensor 322. The basis amount of diesel fuel to be supplied is corrected based on the difference between the catalyst temperature and the inlet exhaust gas temperature detected by the inlet exhaust gas temperature sensor 321. The purification rate of the catalyst can thus be prevented from being deteriorated at a transient time.

10 Claims, 6 Drawing Sheets

EXHAUST EMISSION PURIFICATION APPARATUS FOR AN INTERNAL COMBUSTION ENGINE

BACKGROUND OF THE INVENTION

1. Field of the Invention

The present invention relates to an exhaust emission purification apparatus for an internal combustion engine or, in particular, to an exhaust emission purification apparatus for an internal combustion engine using a lean $NO_x$ catalyst.

2. Description of the Related Art

A three-way catalyst for purifying carbon monoxide, hydrocarbon and nitrogen oxides at the same time has found application as an exhaust emission purification apparatus for an internal combustion engine. For the exhaust emission gas to be efficiently purified by a three-way catalyst, however, it is necessary that the air-fuel ratio of the mixture supplied to the internal combustion engine is maintained at substantially a stoichiometric air-fuel ratio.

However, in the case where a three-way catalyst is used for a lean-burn internal combustion engine in which the air-fuel ratio of the mixture is set lean while the vehicle is running normally in order to reduce the fuel consumption, the carbon monoxide and hydrocarbon can be removed but the nitrogen oxide cannot be removed. For this reason, a lean $NO_x$ catalyst using zeolite ion-exchanged with a transition metal has been developed and finds practical applications.

When $NO_x$ is to be purified by the lean $NO_x$ catalyst, the presence of a hydrocarbon is essential, and it is necessary to supply a hydrocarbon upstream of the lean $NO_x$ catalyst.

Because the hydrocarbon thus supplied generates heat when being oxidized in the lean $NO_x$ catalyst, the temperature of the lean $NO_x$ catalyst increases excessively and sometimes deviates from a temperature range (window) set for achieving a proper purification rate.

In an attempt to solve this problem, an exhaust emission purification apparatus for internal combustion engines has been proposed (Japanese Unexamined Patent Publication 4-214919), in which the amount of hydrocarbon supplied is controlled on the basis of the state of variables (including the lean $NO_x$ catalyst temperature, the space velocity representing the exhaust gas flow rate through the lean $NO_x$ catalyst, or the engine speed and the accelerator opening) representing the operating conditions of the lean $NO_x$ catalyst.

The map for determining the amount of hydrocarbon to be supplied, however, corresponds to state variables which are substantially steady. Under transient operating conditions such as accelerating conditions or decelerating condition, catalyst temperature deviation, to outside the window, and deterioration of the purification rate are unavoidable.

Figure 1:
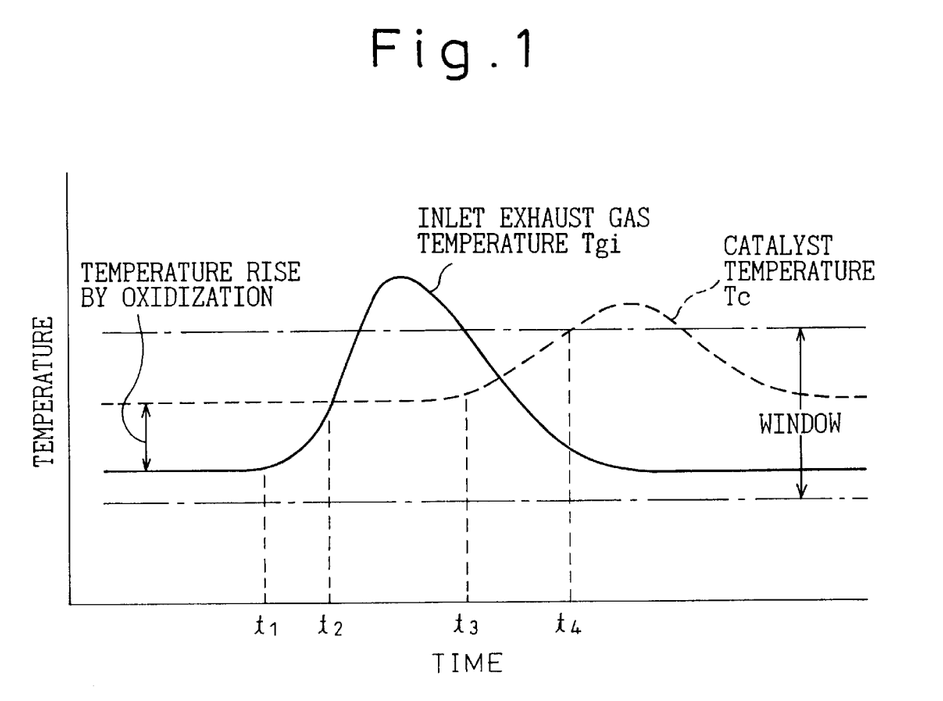
FIG. 1 is a diagram for explaining the problems.

FIG. 1 is a diagram for explaining the above-mentioned problem, in which the abscissa represents the time and the ordinate the temperature.

Specifically, in the steady state at and before time $t_1$, the catalyst temperature $T_c$ is higher than the exhaust emission gas temperature $T_{gi}$ at the catalyst inlet due to heat generated by the oxidization of the supplied hydrocarbon.

When acceleration starts at time $t_1$, the inlet exhaust gas temperature $T_{gi}$ rises, so that the lean $NO_x$ catalyst begins to be heated after $t_2$ when the inlet exhaust gas temperature $T_{gi}$ exceeds the catalyst temperature $T_c$.

Due to the thermal capacity of the lean $NO_x$ catalyst, however, the catalyst temperature $T_c$ does not rise immediately, but begins to rise only at $t_3$, and deviates from the window at time $t_4$.

The same problem occurs also in the deceleration condition, when the catalyst temperature $T_c$ begins to drop and deviates from the window some time after the deceleration starts.

The present invention has been developed in view of the above-mentioned problem, and the object thereof is to provide an exhaust emission purification apparatus for an internal combustion engine in which the proper purification rate can be maintained even at the time of a transient by suppressing excessive temperature fluctuations of the lean $NO_x$ catalyst.

SUMMARY OF THE INVENTION

According to the present invention, there is provided an exhaust emission purification apparatus for an internal combustion engine comprising a lean $NO_x$ catalyst installed in the exhaust pipe of the internal combustion engine; a hydrocarbon supply means for supplying hydrocarbon into the exhaust gas for reducing the $NO_x$ at the upstream of the lean $NO_x$ catalyst; a state variable detection means for detecting state variables representing the operating conditions of said lean $NO_x$ catalyst; a temperature difference detection means for detecting the difference between the exhaust gas temperature at the inlet of said lean $NO_x$ catalyst and the temperature of said lean $NO_x$ catalyst which are included in the state variables detected by said state variables detection means; and a hydrocarbon supply amount correction means for correcting the basic hydrocarbon supply amount determined by said basic hydrocarbon supply amount determining means in accordance with the difference between the inlet exhaust gas temperature detected by said influent exhaust gas temperature detection means and the lean $NO_x$ catalyst temperature detected by said catalyst temperature detection means.

In this apparatus, the amount of hydrocarbon supplied for reducing $NO_x$ is corrected in accordance with the difference between the inlet exhaust gas temperature and the catalyst temperature. Even in the case where the inlet exhaust gas temperature undergoes a transient fluctuation, therefore, an excessive temperature fluctuation of the lean $NO_x$ catalyst is suppressed, thereby preventing the lean $NO_x$ catalyst temperature from deviating outside a window and the purification rate from being deteriorated.

DETAILED DESCRIPTION OF THE PREFERRED EMBODIMENTS

Figure 2:
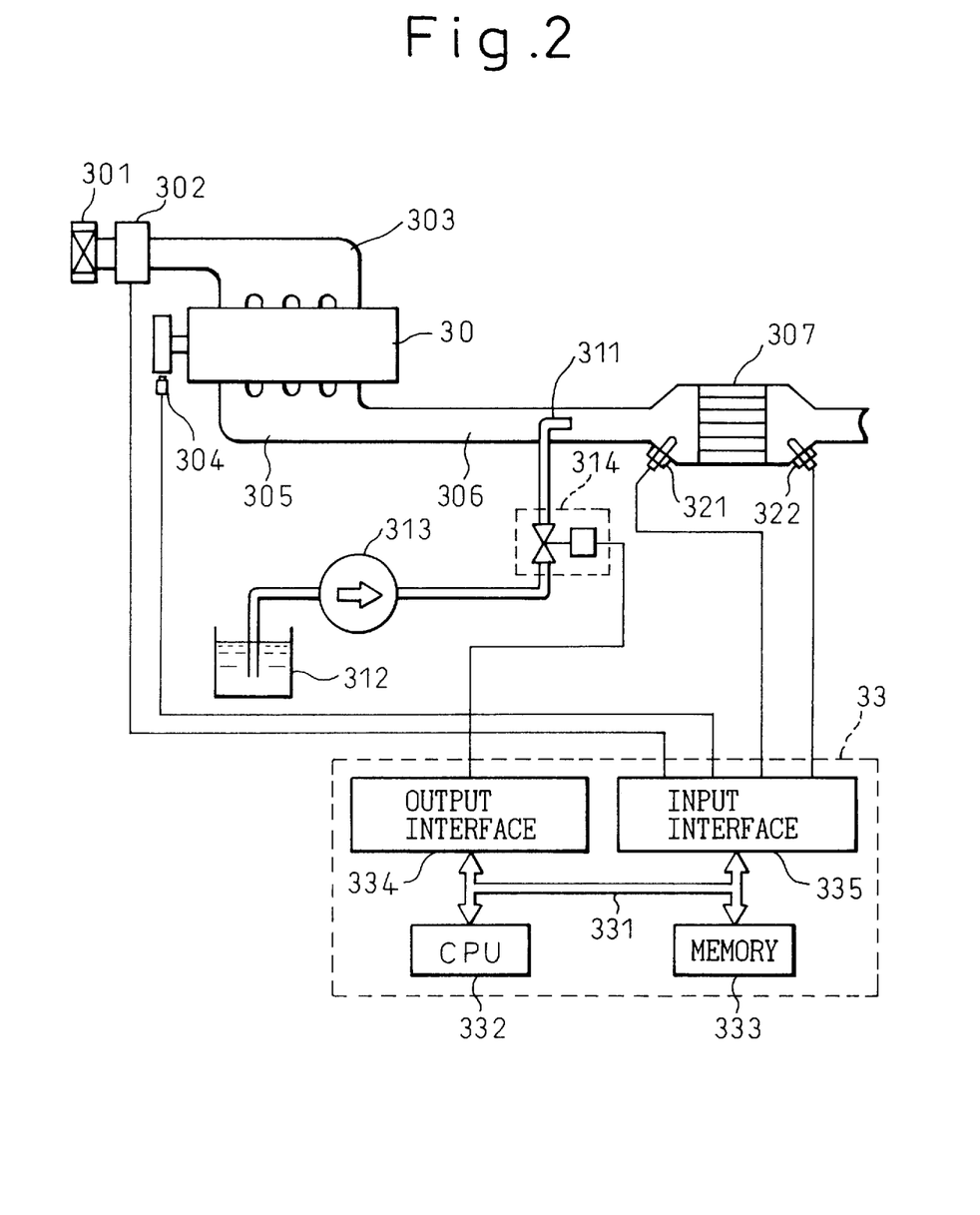
FIG. 2 is a diagram showing a configuration of an embodiment.

FIG. 2 is a diagram showing a configuration of an exhaust emission purification apparatus for an internal combustion engine according to an embodiment of the present invention. The intake air for an internal combustion engine 30 is supplied through an air cleaner 301, an air flowmeter 302 and an intake manifold 303.

The exhaust gas from the internal combustion engine 30 is supplied to an exhaust gas purification apparatus 307 having a lean $NO_x$ catalyst through an exhaust manifold 305 and an exhaust pipe 306, and is released into the atmosphere, after poisonous components thereof are removed.

A diesel fuel injection hole 311 is inserted in the exhaust pipe 306 upstream of the exhaust gas purification apparatus 307. The diesel fuel stored in a diesel fuel tank 312, pressured by a diesel fuel pump 313 and functioning as a $NO_x$ reducing agent is injected into the exhaust gas. The injected amount of the diesel fuel thus is controlled by adjusting the opening of a solenoid valve 314.

An inlet exhaust gas temperature sensor 321 and an outlet exhaust gas temperature sensor 322 for detecting the temperature of the exhaust gas are installed at the inlet and the output, respectively, of the exhaust gas purification apparatus 307. According to this embodiment, it is difficult to detect the temperature of the lean $NO_x$ catalyst directly, and therefore the temperature detected by the outlet exhaust gas temperature sensor 322 is used as a catalyst temperature.

The exhaust gas purification apparatus for the internal combustion engine described above is controlled by a controller 33 constituting a microcomputer system. The controller 33 includes a bus 331, a CPU 332, a memory 333, an output interface 334 and an input interface 335 built around the bus 331.

The input interface 335 is connected with an internal combustion engine speed sensor 304, an air flowmeter 302, an inlet exhaust gas temperature sensor 321 and an outlet exhaust gas temperature sensor 322. The outlet interface 334 is connected with the solenoid valve 314.

Figure 3:
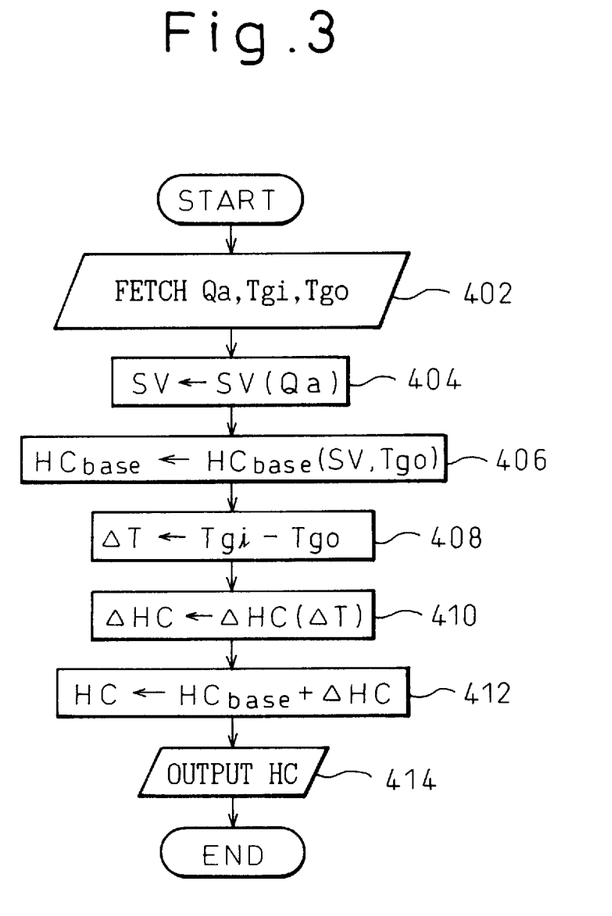
FIG. 3 is a flowchart showing a diesel fuel supply amount control routine.

FIG. 3 is a flowchart showing a diesel fuel supply amount control routine stored in the memory 33 and executed in the CPU 332.

Step 402 fetches the intake air amount $Q_a$ detected by the air flowmeter 302, the inlet exhaust gas temperature $T_{gi}$ detected by the inlet exhaust gas temperature sensor 321 and the outlet exhaust gas temperature $T_{go}$ detected by the outlet exhaust gas temperature sensor 322.

Step 404 calculates the space velocity SV which is a state variable representing the operating conditions of the exhaust gas purification apparatus 307 on the basis of the intake air amount $Q_a$.

$$SV \leftarrow SV(Q_a)$$

Then, step 406 calculates the basic diesel fuel supply amount $HC_{base}$ as a function of the outlet exhaust gas temperature $T_{go}$ used in place of the catalyst temperature and the space velocity SV.

$$HC_{base} \leftarrow HC_{base}(SV, T_{go})$$

Figure 4:
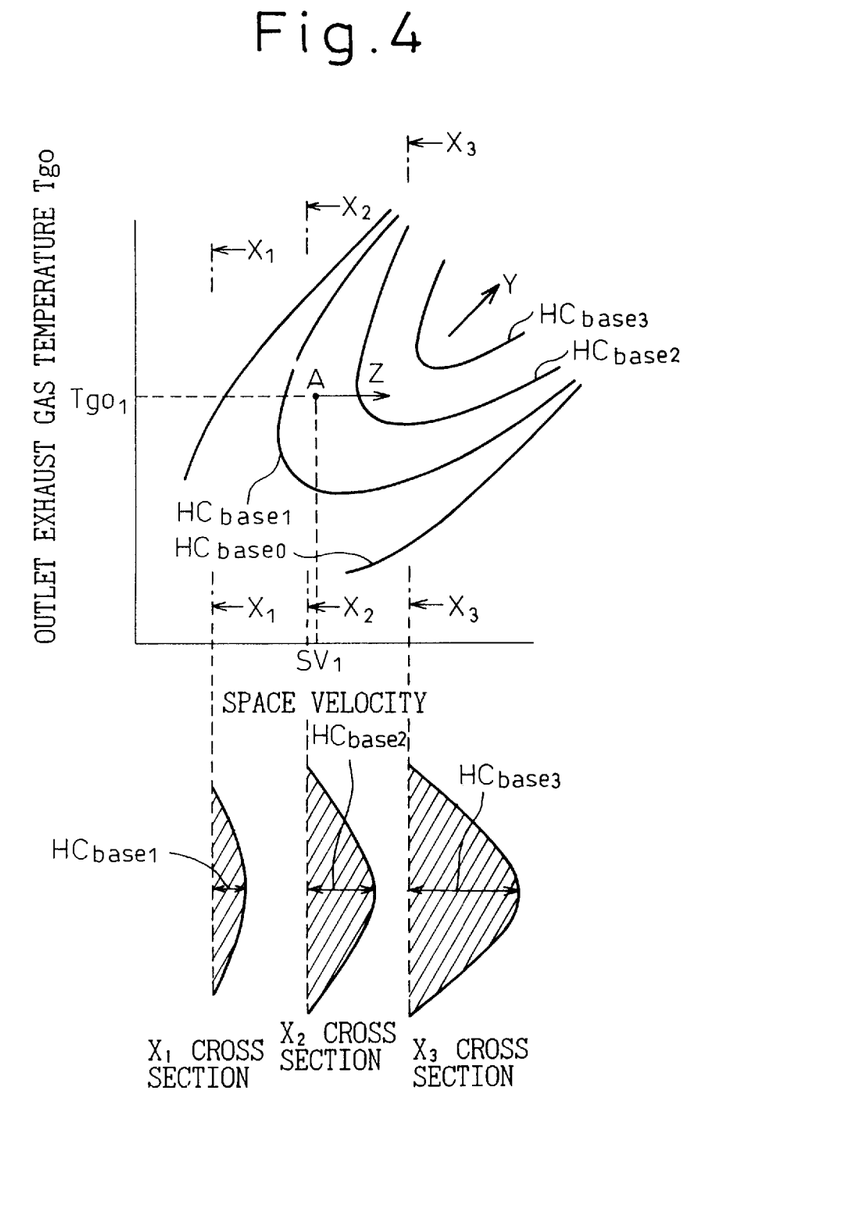
FIG. 4 is a map for determining a basic diesel fuel supply amount.

FIG. 4 is a map for determining the basic diesel fuel supply amount $HC_{base}$, in which the abscissa represents the space velocity SV, the ordinate the outlet exhaust gas temperature $T_{go}$ and the contour lines the basic diesel fuel supply amount $HC_{base}$. The basic diesel fuel supply amount $HC_{base}$ increases progressively from $HC_{base0}$ toward $HC_{base3}$. Further, FIG. 4 shows cross sections taken in lines $X_1$—$X_1$, $X_2$—$X_2$, $X_3$—$X_3$.

Specifically, the basic diesel fuel supply amount $HC_{base}$ assumes an angular shape in the window area with the supply mount which is highest at the center and reduced progressively toward the boundaries. Upon deviation from the window, the supply amount becomes zero. In other words, the height of each cross section represents the basic diesel fuel supply amount $HC_{base}$.

More specifically, the basic diesel fuel supply amount $HC_{base}$ has an angular shape which is progressively higher toward the upper right (in the direction of arrow Y). In this way, the basic diesel fuel supply amount $HC_{base}$ increases.

Step 408 calculates the temperature difference $\Delta T$ between the inlet exhaust gas temperature $T_{gi}$ and the outlet exhaust gas temperature $T_{go}$. Step 410 calculates the correcting diesel fuel supply amount $\Delta HC$ as a function of the temperature difference $\Delta T$.

$$\Delta T \leftarrow T_{gi} - T_{go}$$

$$\Delta HC \leftarrow \Delta HC(\Delta T)$$

Figure 5:
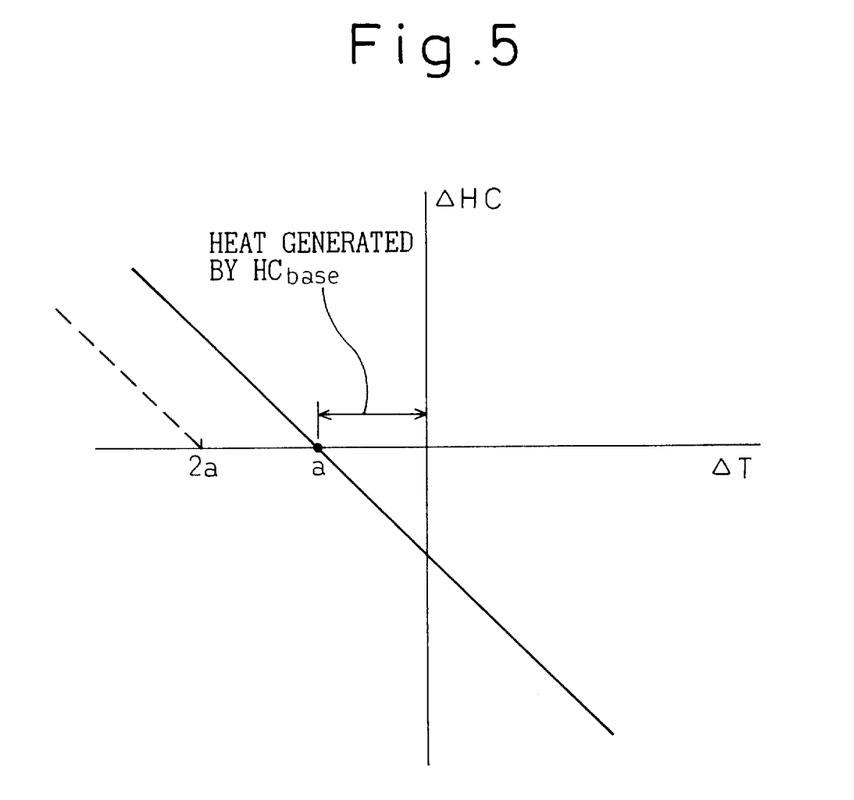
FIG. 5 is a map for determining a correcting diesel fuel supply amount.

FIG. 5 is a map for determining the correcting diesel fuel supply amount $\Delta HC$, in which the abscissa represents the temperature difference $\Delta T$ and the ordinate the correcting diesel fuel supply amount $\Delta HC$.

Specifically, in order to set the correcting diesel fuel supply amount $\Delta HC$ to zero in a steady state, the abscissa is crosses the abscissa at a point "a" representing the state in which the outlet exhaust gas temperature $T_{go}$ is higher than the inlet exhaust gas temperature $T_{gi}$ by the amount of heat generated by the basic diesel fuel supply amount $HC_{base}$.

The larger the temperature difference $\Delta T$ becomes, i.e., the more the lean $NO_x$ catalyst is heated due to the rise of the inlet exhaust gas temperature $T_{gi}$, the more the correcting diesel fuel supply amount $\Delta HC$ is reduced (the absolute value is increased in the negative direction) to suppress the temperature increase of the lean $NO_x$ catalyst. In the case where the inlet exhaust gas temperature $T_{gi}$ drops, on the other hand, the correcting diesel fuel supply amount $\Delta HC$ is increased in order to increase the temperature of the lean $NO_x$ catalyst.

Note, because the outlet exhaust gas temperature is increased by the oxidizing heat of the supplied diesel fuel, an immediate decreasing correction is not required when the inlet exhaust gas temperature drops under the lower limit temperature of the window.

Namely, diesel fuel supply amount may be corrected after the temperature difference $\Delta T$ becomes smaller than the temperature which corresponds to $2 \times HC_{base}$.

FIG. 5 shows a linear function. Other functions can alternatively be used as far as the relation is held that with the increase in the temperature difference $\Delta T$, the correcting diesel fuel supply amount $\Delta HC$ decreases, while with the decrease in the temperature difference $\Delta T$, the correcting diesel fuel supply amount $\Delta HC$ increases.

Step 412 calculates the diesel fuel supply amount HC by adding the basic diesel fuel supply amount $HC_{base}$ to the correcting diesel fuel supply amount $\Delta HC$. Step 414 supplies a pulse train having a duty factor corresponding to the diesel fuel supply amount HC to the solenoid valve 314 through the output interface 334, and thus controls the amount of the diesel fuel injected from the diesel fuel injection hole 311.

Figure 6A:
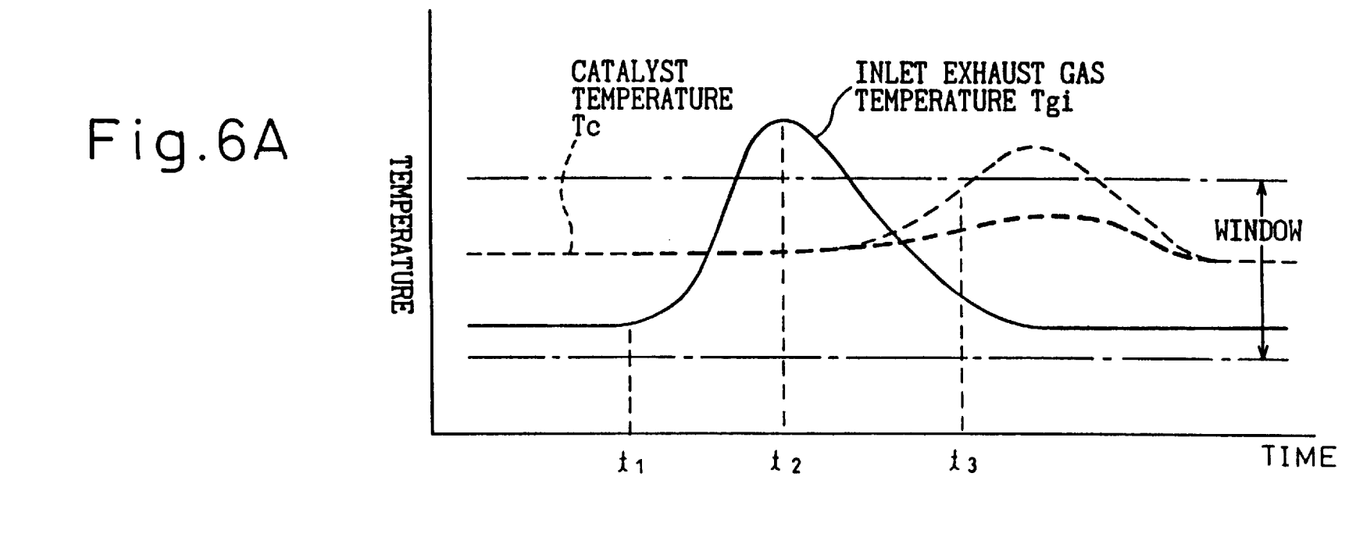
FIGS. 6A and 6B are diagrams for explaining the effects of the invention.
Figure 6B:
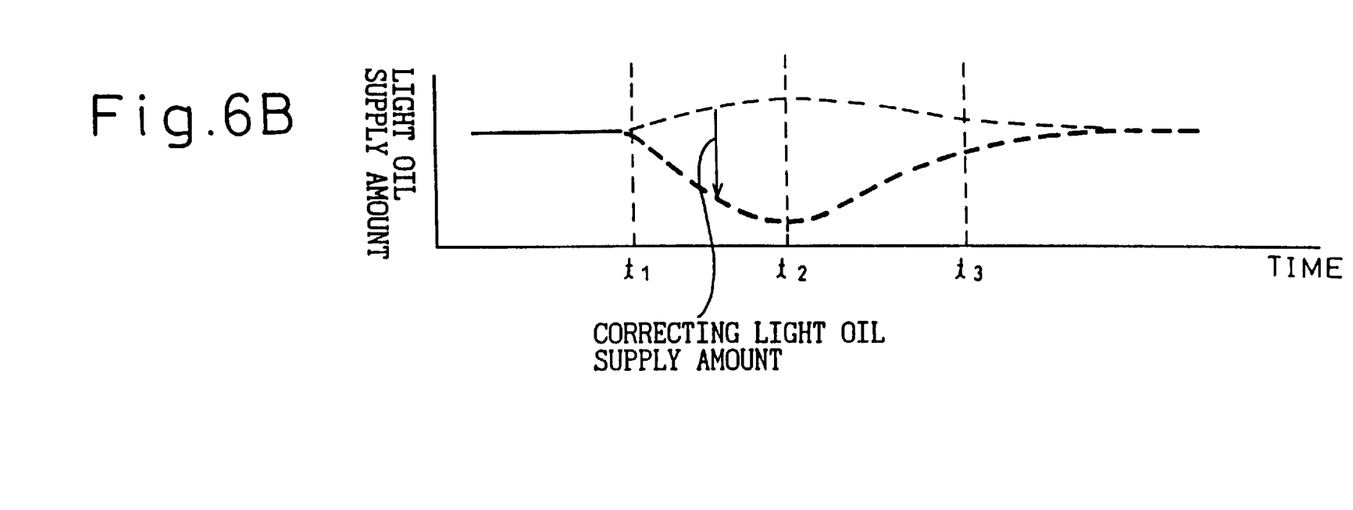

FIGS. 6A and 6B are diagrams for explaining the effects of the present invention, in which the abscissa represents the time, and the ordinate the temperature (upper part) and the diesel fuel supply amount (lower part).

In the upper part of the graph, the solid line represents the inlet exhaust gas temperature $T_{gi}$ and the dashed line the catalyst temperature $T_c$. In the two graphs, the thick dashed line represents an application of the present invention, and the thin dashed line the case in which the present invention is not applicable.

Assume that the engine is operating at point A (FIG. 4) where the space velocity is $SV_1$ and the outlet exhaust gas temperature is $T_{go}$ (i.e., the catalyst temperature is $T_c$) in steady state at or before time point $t_1$.

First, consider the case where the invention is not applicable, i.e., the case where only the basic diesel fuel supply amount is used. The condition involved is described below.

At $t_1$ when acceleration starts, the intake air amount increases and so does the space velocity. In spite of this, the catalyst temperature $T_c$ remains substantially unchanged due to the thermal capacity of the lean $NO_x$ catalyst. As a result the operation point moves rightward from point A so that, as shown by the thin dashed line in the lower part of the graph, the amount of diesel fuel supplied steadily increases and reaches a maximum point at time $t_2$ when the inlet exhaust gas temperature $T_{gi}$ reaches a maximum.

In this way, the amount of heat received by the lean $NO_x$ catalyst increases not only with the temperature increase of the exhaust gas but with the increase in the amount of diesel fuel supplied. As shown by the thin dashed line in the upper part of the graph, therefore, the catalyst temperature $T_c$ gradually increases to such an extent that it deviates from the window at time $t_3$.

According to the present invention, in contrast, with the increase of the inlet exhaust gas temperature $T_{gi}$ from time point $t_1$, the temperature difference $\Delta T$ between the inlet exhaust gas temperature $T_{gi}$ and the outlet exhaust gas temperature $T_{go}$ increases. As shown by the thick dashed line in the lower part of the graph, therefore, the correcting diesel fuel supply amount $\Delta H$ suppresses the increase in the diesel fuel supply amount.

Consequently, in spite of the fact that the amount of heat received by the lean $NO_x$ catalyst increases with the temperature of the exhaust gas, the diesel fuel supply amount is suppressed, so that the heat generated by the $NO_x$ reduction due to the diesel fuel is rather reduced. As shown by the thick dashed line in the upper part of the graph, therefore, the catalyst temperature $T_c$ is prevented from deviating from the window.

The basic diesel fuel supply amount $HC_{base}$, which is determined from the map of the catalyst temperature represented by the outlet exhaust gas temperature $T_{go}$ and the space velocity SV according to the present embodiment, can alternatively be determined from the map of the intake air amount and the rotational speed of the internal combustion engine. In such a case, the speed of the internal combustion engine is detected by the rpm sensor 304.

Note, this invention can be applied when the vehicle is running under steady state condition and the inlet exhaust gas temperature and the catalyst temperature are within the window.

Further, although the diesel fuel is used as a hydrocarbon for reducing $NO_x$ in the above-mentioned embodiment, other hydrocarbon materials such as alcohol can be used with equal effect.

What is claimed is:

1. An exhaust emission gas purification apparatus for an internal combustion engine, comprising:

a lean $NO_x$ catalyst arranged in the exhaust pipe of an internal combustion engine;

a hydrocarbon supply means for supplying hydrocarbon into the exhaust gas for reducing $NO_x$ upstream of said $NO_x$ catalyst;

a state variables detection means for detecting state variables representing the operating conditions of said lean $NO_x$ catalyst;

a basic hydrocarbon supply amount determining means for determining the basic amount of hydrocarbon supplied from said hydrocarbon supply means in accordance with the state variables detected by said state variables detection means;

a temperature difference detection means for detecting the difference between the exhaust gas temperature at the inlet of said lean $NO_x$ catalyst and the temperature of the lean $NO_x$ catalyst which are included in the state variables detected by said state variables detection means; and a hydrocarbon supply amount correction means for correcting the basic hydrocarbon amount determined by said basic hydrocarbon supply amount determining means in accordance with the temperature difference detected by said temperature difference detection means.

2. An exhaust emission gas purification apparatus for internal combustion engines according to claim 1, wherein said state variables detection means includes an intake air amount detection means for detecting the intake air amount of the internal combustion engine, and a lean catalyst temperature detection means for detecting the temperature of said lean catalyst.

3. An exhaust emission gas purification apparatus for internal combustion engines according to claim 2, wherein said lean catalyst temperature detection means detects the exhaust gas temperature at the outlet of said lean catalyst.

4. An exhaust emission gas purification apparatus for internal combustion engines according to claim 1, wherein said state variables detection means includes an intake air amount detection means for detecting the intake air amount of the internal combustion engine, and an engine speed detection means for detecting the rotational speed of the internal combustion engine.

5. An exhaust emission gas purification apparatus for internal combustion engines according to claim 1, wherein said temperature difference detection means detects the difference in the exhaust gas temperature between the inlet and the outlet of said $NO_x$ catalyst.

6. An exhaust emission gas purification method for internal combustion engines, comprising the steps of:

supplying hydrocarbon into the exhaust gas for reducing the $NO_x$ upstream of the lean $NO_x$ catalyst arranged in the exhaust pipe of the internal combustion engine;

detecting the state variables representing the operating conditions of said lean $NO_x$ catalyst;

determining the basic amount of hydrocarbon supplied in said hydrocarbon supply step in accordance with the state variables detected in said state variables detection step;

detecting the difference between the temperature of the exhaust gas at the inlet of said lean $NO_x$ catalyst and the temperature of said lean $NO_x$ catalyst which are included in the state variables detected at said state variables detection step; and correcting the basic hydrocarbon supply amount determined in said basic hydrocarbon supply amount determining step in accordance with the temperature difference detected in said temperature difference detection step.

7. An exhaust emission gas purification method for internal combustion engines according to claim 6, wherein said state variables detection step further includes the steps of detecting the intake air amount of the internal combustion engine, and detecting the temperature of said lean catalyst.

8. An exhaust emission gas purification method for internal combustion engines according to claim 7, wherein said lean catalyst temperature detection step further includes the step of detecting the exhaust gas temperature at the outlet of said lean catalyst.

9. An exhaust emission gas purification method for internal combustion engines according to claim 6, wherein said state variables detection step further includes the steps of detecting the intake air amount of the internal combustion engine, and detecting the rotational speed of the internal combustion engine.

10. An exhaust emission gas purification method for internal combustion engines according to claim 6, wherein said temperature difference detection step further includes the step of detecting the difference in the exhaust gas temperature between the inlet and the outlet of said $NO_x$ catalyst.

* * * * *